(12) United States Patent
Sauerer et al.

(10) Patent No.: US 12,442,295 B2
(45) Date of Patent: Oct. 14, 2025

(54) APPLICATION OF ToF-SIMS FOR ANALYSIS OF FORMATION FLUID SAMPLES AND FORMATION ROCK SAMPLES

(71) Applicant: Schlumberger Technology Corporation, Sugar Land, TX (US)

(72) Inventors: Bastian Sauerer, Houston, TX (US); Wael Abdallah, Dhahran (SA)

(73) Assignee: Schlumberger Technology Corporation, Sugar Land, TX (US)

( * ) Notice: Subject to any disclaimer, the term of this patent is extended or adjusted under 35 U.S.C. 154(b) by 326 days.

(21) Appl. No.: 18/065,066

(22) Filed: Dec. 13, 2022

(65) Prior Publication Data
US 2024/0191623 A1    Jun. 13, 2024

(51) Int. Cl.
*E21B 49/08* (2006.01)
*G01N 23/2258* (2018.01)
*G01N 33/24* (2006.01)
*E21B 49/10* (2006.01)

(52) U.S. Cl.
CPC ..... *E21B 49/0875* (2020.05); *G01N 23/2258* (2013.01); *G01N 33/241* (2013.01); *E21B 49/10* (2013.01)

(58) Field of Classification Search
CPC . E21B 49/0875; E21B 49/10; G01N 23/2258; G01N 33/241
See application file for complete search history.

(56) References Cited

U.S. PATENT DOCUMENTS

| | | | |
|---|---|---|---|
| 2014/0110343 A1 | 4/2014 | Jarvis | |
| 2015/0323516 A1 | 11/2015 | Washburn | |
| 2018/0347354 A1* | 12/2018 | Li | G06N 20/00 |
| 2021/0363883 A1 | 11/2021 | Jones | |
| 2022/0228997 A1* | 7/2022 | Sandu | G01N 33/241 |

FOREIGN PATENT DOCUMENTS

EP    1461821 B1    12/2009

OTHER PUBLICATIONS

Arisz et al., 2020. Dynamics of Molecules Observed at Crude Oil—Gas Interfaces by Time-of-Flight Secondary Ion Mass Spectrometry Imaging. J. Am. Soc. Mass Spectrom. 31, 2356-2361.
Yu et al., 2016. In Situ Characterization of Hydrated Proteins in Water by SALVI and ToF-SIMS. J. Vis. Exp. 108, 1-8.
(Continued)

*Primary Examiner* — David Z Huang
(74) *Attorney, Agent, or Firm* — Jeffrey D. Frantz

(57) ABSTRACT

A workflow is provided that extracts and isolates an oil/water interface of a formation fluid sample and employs a ToF-SIMS instrument to characterize properties of the oil-water interface of the formation fluid sample. Additionally or alternatively, the workflow can use a ToF-SIMS instrument to analyze a formation rock sample and characterize properties of the formation rock sample. The workflow can also involve combining the at least one property related to the oil-water interface of the formation fluid sample and the least one property related to the formation rock sample for output or display to a user.

28 Claims, 5 Drawing Sheets

(56) References Cited

OTHER PUBLICATIONS

Shen et al., 2020. Liquid ToF-SIMS revealing the oil, water, and surfactant interface evolution. Phys. Chem. Chem. Phys. 22, 11771-11782.
Mathez et al., 1998. Characterization of carbon compounds on a pyroxene surface from a gabbro xenolith in basalt by time-of-flight secondary ion mass spectrometry. Amer. Min. 83, 918-924.
Mogk et al., 2000. Carbonaceous films in midcrustal rocks from the KTB borehole, Germany, as characterized by Time-of-Flight secondary ion mass spectrometry. Geochemistry, Geophysics, Geosystems, https://doi.org/10.1029/2000GC000081 (29 pages).
Stephan et al., 1994. ToF-SIMS Analysis of Interplanetary dust, Earth and Planetary Science Letters, v. 128 #3-4, p. 453-467.
Toporski et al., 2004. Characterization of purified biomarker compounds using time of flight secondary ion mass spectrometry (ToF-SIMS), Organic Chemistry 35, 793-811.
Hou et al. in "Application of imaging ToF-SIMS to the study of some coal macerals," International Journal of Coal Geology 27, 1995, pp. 23-32.
Farrimond et al. "Biomarker maturity parameters: the role of generation and thermal degradation," Org. Geochemistry, vol. 29, No. 5-7, 1998, pp. 1181-1197.
Mahavadi et al., 2022, Role of Polar Species in Determining the Interfacial Tension of a Crude Oil/Water System, Energy Fuels 2022, 36, 8769-8777.
Le Doan et al., 2013, Green River Oil Shale Pyrolysis: Semi-Open Conditions, Energy Fuels, 2013, 27, 6447-6459.
Andersen et al., 2016, Detection and Impact of Carboxylic Acids at the Crude Oil-Water Interface, Energy Fuels, 2016, 30, 4475-4485.

\* cited by examiner

APPLICATION OF ToF-SIMS FOR ANALYSIS OF FORMATION FLUID SAMPLES AND FORMATION ROCK SAMPLES

FIELD

The present disclosure relates to processes and systems that analyze chemical properties of formation fluid samples and formation rock samples.

BACKGROUND

Time-of-flight secondary ion mass spectrometry (ToF-SIMS) is an analytical method that applies a pulsed ion beam that removes ionic species from a sample surface in a vacuum environment. The removed ionic species are further accelerated into a flight tube and their mass determined by time-of-flight detection. Since the ionic species are removed in a monolayer range, this method is highly surface-sensitive.

Most applications of ToF-SIMS rely on air drying samples, followed by vacuum desiccation as the measurement is conducted in a vacuum environment. J. Yu et al. in "In Situ Characterization of Hydrated Proteins in Water by SALVI and ToF-SIMS," J. Vis. Exp. 108, 2016, pgs. 1-8, describes one application of ToF-SIMS that analyzes a hydrated biologic sample (i.e., protein in its native hydrated state) contained in a microfluidic device. Y. Shen et al. in "ToF-SIMS revealing the oil, water, and surfactant interface evolution," Phys. Chem. Chem. Phys. 22, 2020, pgs. 11771-11782, describes another application of ToF-SIMS that models oil/water interfaces. Mathez et al. in "Characterization of carbon compounds on a pyroxene surface from a gabbro xenolith in basalt by time-of-flight secondary ion mass spectrometry," Amer. Min. 83, 1998, pgs. 918-924; Mogk et al. in "Carbonaceous films in midcrustal rocks from the KTB borehole, Germany, as characterized by Time-of-Flight," Geochemistry, Geophysics, Geosystems, https://doi.org/10.1029/2000GC000081; Stephan et al. in "ToF-SIMS Analysis of Interplanetary dust." Earth and Planetary Science Letters, v. 128 #3-4, 1994, pgs. 453-467; and Toporski et al. in "Characterization of purified biomarker compounds using time of flight secondary ion mass spectrometry (ToF-SIMS)," Organic Chemistry 35, 2004, pgs. 793-811 describe other applications of ToF-SIMS that characterize earth samples, interplanetary dust, and purified organic compounds. Hou et al. in "Application of imaging ToF-SIMS to the study of some coal macerals," International Journal of Coal Geology 27, 1995, pgs. 23-32 described an application of ToF-SIMS that identifies coal macerals.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

The subject disclosure describes an embodiment of a workflow that extracts and isolates an oil-water interface of a formation fluid sample and employs a ToF-SIMS instrument to characterize properties of the oil-water interface of the formation fluid sample.

In embodiments, a solid-phase test sample is prepared from the oil-water interface extracted from the formation fluid sample. The solid-phase test sample can include surface-reactive species and solid adsorbed species of the oil-water interface. A TOF-SIMS instrument can be configured to analyze the solid-phase test sample to determine a mass spectrum of the solid-phase test sample. The mass spectrum of the solid-phase test sample can be processed to determine at least one property of the oil-water interface of the formation fluid sample. In embodiments, the at least one property can represent interfacial tension or interfacial elasticity behavior of the oil-water interface of the formation fluid sample.

The subject disclosure also describes an embodiment of a workflow that employs a ToF-SIMS instrument to analyze a formation rock sample and characterize properties of the formation rock sample. The TOF-SIMS instrument can be configured to analyze the formation rock sample or part thereof to determine a mass spectrum of the formation rock sample or part thereof. The mass spectrum of the formation rock sample or part thereof can be processed to determine at least one property of the formation rock sample or part thereof. The at least one property can represent salinity of at least one fluid inclusion in the formation rock sample or part thereof, thermal maturity of kerogen in the formation rock sample or part thereof, or kerogen or biomarkers in the formation rock sample or part thereof.

In embodiments, the workflow can also involve combining the at least one property of the oil-water interface of the formation fluid sample and the least one property of the formation rock sample for output or display to a user.

BRIEF DESCRIPTION OF THE DRAWINGS

The subject disclosure is further described in the detailed description which follows, in reference to the noted plurality of drawings by way of non-limiting examples of the subject disclosure, in which like reference numerals represent similar parts throughout the several views of the drawings, and wherein.

DETAILED DESCRIPTION

The particulars shown herein are by way of example and for purposes of illustrative discussion of the embodiments of the subject disclosure only and are presented in the cause of providing what is believed to be the most useful and readily understood description of the principles and conceptual aspects of the subject disclosure. In this regard, no attempt is made to show structural details in more detail than is necessary for the fundamental understanding of the subject disclosure, the description taken with the drawings making apparent to those skilled in the art how the several forms of the subject disclosure may be embodied in practice. Furthermore, like reference numbers and designations in the various drawings indicate like elements.

It is to be understood that the present disclosure provides many different embodiments, or examples, for implementing different features of various embodiments. Specific examples of components and arrangements are described below to simplify the present disclosure. These are, of course, merely examples and are not intended to be limiting.

Figure 1:
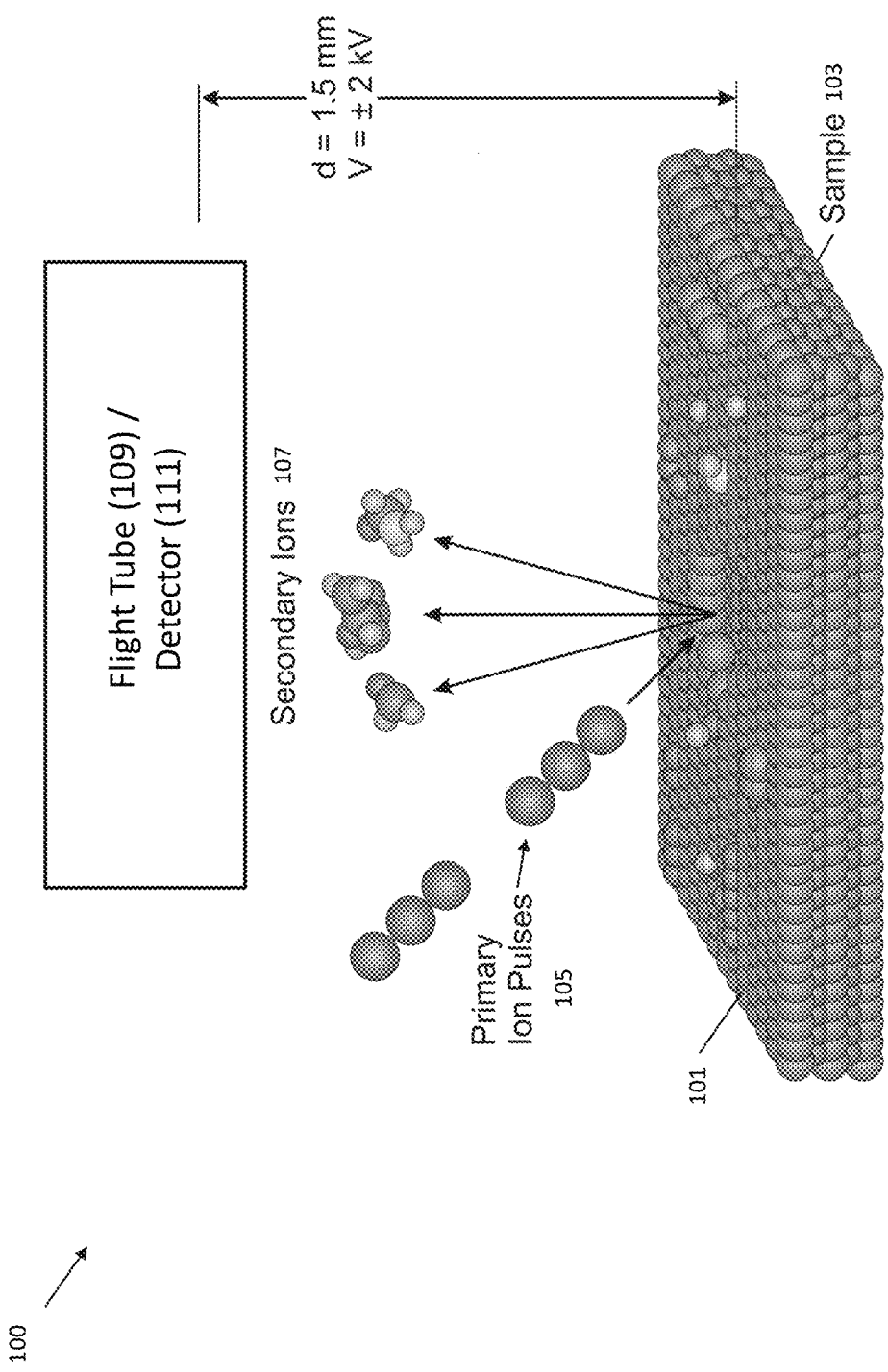
FIG. 1 is a schematic diagram of a ToF-SIMS instrument configured to analyze a sample.

As used herein, a "mass spectrum" is information that relates intensity (e.g., ion count) as a function of mass to charge ratio representing a chemical analysis of a sample obtained by a mass spectrometer, such as a ToF-SIMS instrument (FIG. 1).

As used herein, a "vacuum environment" is an environment in which the pressure is considerably lower than atmospheric pressure, for example, less than $10^{-07}$ bar.

FIG. 1 illustrates a Time-of-Flight Secondary Ion Mass Spectrometer (TOF-SIMS) instrument 100, which is an ultra-high resolution mass spectrometer that possesses both surface sensitivity (few atomic layers) and elemental sensitivity (up to parts-per-billion). The TOF-SIMS instrument 100 bombards a sample surface 101 of a sample 103 with a high energy pulsed ion beam (i.e., primary ion beam pulses 105) that produces a yield of secondary ions 107 from the sample surface 101. By applying a high voltage between the sample surface and a flight tube 109 situated in close proximity thereto, the secondary ions 107 are directed into the flight tube 109 while gaining the same amount of kinetic energy, independent of their mass, since the electrostatic potential energy is only proportional to the charge. However, due to their mass difference, the secondary ions 107 will gain different velocities at the entrance of the flight tube 109 as the kinetic energy is proportional to the product of mass and velocity squared. Thus, different species of secondary ions 107 will possess different velocities at the entrance of the flight tube 109. To further separate these species in time, the species are allowed to drift for a long distance (few meters, translating into tens to hundreds of microseconds travel time, i.e. time of flight, depending on their mass/velocity) until they reach a detector 111. The detector 111 is configured to log parameters for each species of secondary ions 107 that reach the detector 111 to determine a mass spectrum of the sample. The mass spectrum can be one-dimensional mass spectrum of the species' distribution at a point or location on the sample surface 101. The mass spectrum can also be a two-dimensional (2D) mass spectrum of the species' distribution over a scan area of the sample surface 101 (imaging) with high lateral resolution (up to 70 nm), a 1D depth profile of the species' distribution as a function of depth from the sample surface 101, and, if combining the two, a 3D mass spectrum depth profile over a scan volume. For measuring depth profiles and 3D depth profiles, the TOF-SIMS instrument can include an auxiliary ion source that is configured to bombard the sample with high-energy sputter ions that abrade away layers of the sample. In embodiments, the primary ion beam can include bismuth ions (Bit, Biz, $Bi_3^{++}$), cesium ions ($Cs^+$, $C_{60}^{++}$, $Cs_{60}^{+++}$), or other suitable ions, and the sputter ions can include cesium ions ($Cs^+$, $Cs_{60}^{++}$, $Cs_{60}^{+++}$) or other suitable ions. The TOF-SIMS instrument can be configured in a negative mode or a positive mode. The negative mode measures the mass spectrum of negatively-charged secondary ions, while the positive mode measures the mass spectrum of positively-charged secondary ions.

Figure 2:
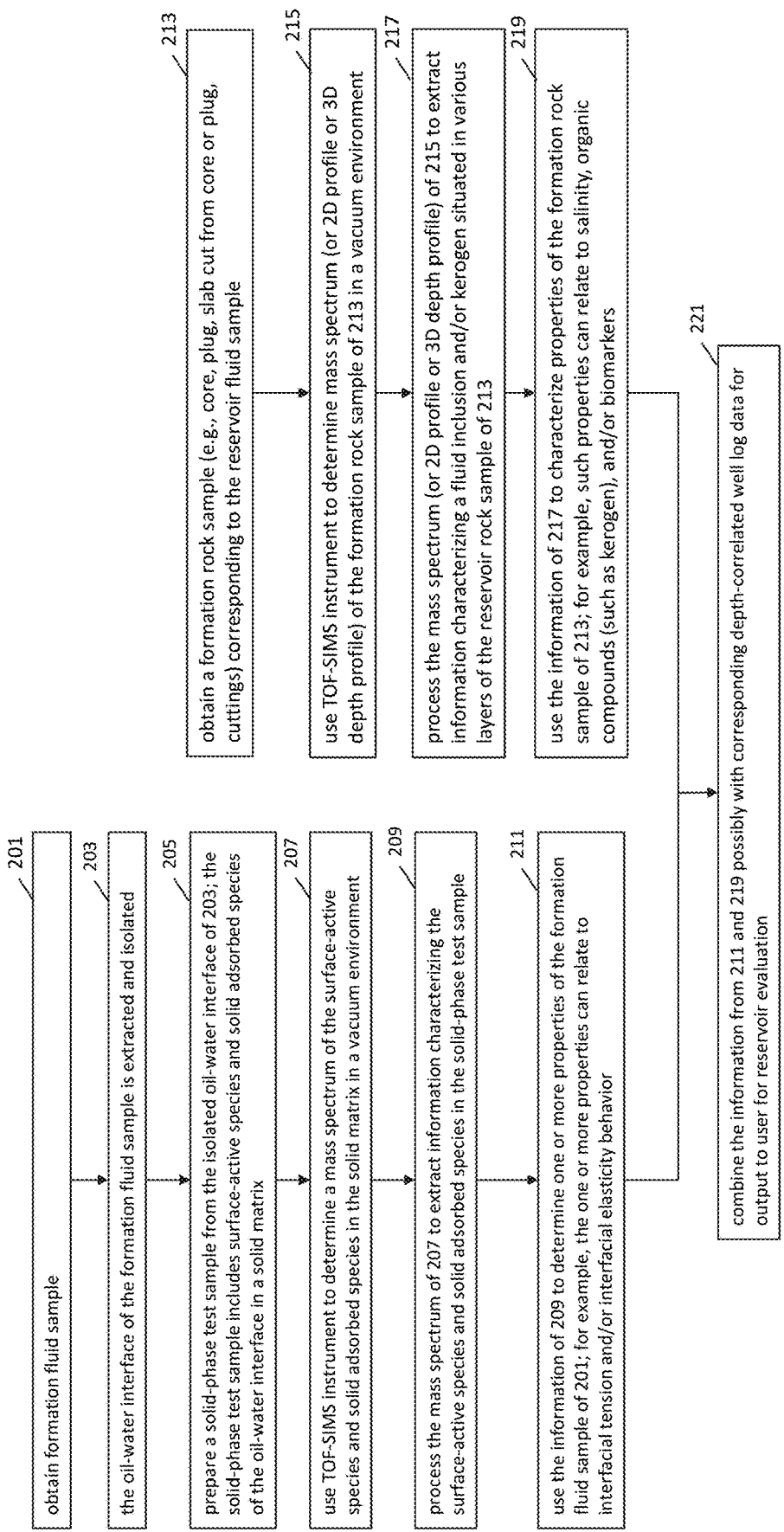
FIG. 2 is a flowchart that illustrates a workflow that employs one or more ToF-SIMS instruments to characterize properties of the oil-water interface of a formation fluid sample and properties of a corresponding formation rock sample.

FIG. 2 illustrates a workflow that employs one or more ToF-SIMS instruments to characterize properties of the oil-water interface of a formation fluid sample and properties of a corresponding formation rock sample.

In step 201, a formation fluid sample is obtained. The formation fluid sample can be collected by in situ reservoir fluid sampling operations performed by commercially-available downhole tools or other suitable reservoir fluid sampling techniques.

In step 203, the oil-water interface of the formation fluid sample is extracted and isolated. The oil-water interface of the formation fluid sample can include a film or skin of solid material surrounding droplets of crude oil in water. The film can be ascribed to asphaltenes and resin content (polar components) of the formation fluid sample. In embodiments, the oil-water interface of the formation fluid sample can be extracted and isolated using a Langmuir trough method or other suitable method. In the Langmuir trough method, the formation fluid sample (or part thereof) is added to a trough and allowed to equilibrate at room temperature for a period of time (e.g., 24 hours). Material that is not part of the oil-water interface can be removed without disturbing the interface. This process can optionally be repeated one or more times to remove material that is not strongly adsorbed to the oil-water interface. After the removal of the material, the isolated oil-water interface can be transferred to a carrier by skimming the oil-water interface from the trough.

In step 205, a solid-phase test sample (e.g., FIG. 3) is prepared from the isolated oil-water interface of 203. The solid-phase test sample can include surface-active species and solid adsorbed species of the oil-water interface in a solid matrix. In embodiments, the solid-phase test sample can be prepared by heating or drying the isolated oil-water interface of 203 (or portion thereof) to evaporate volatile hydrocarbons and water of the isolated oil-water interface while leaving behind solids that include surface-active species and solid adsorbed species of the oil-water interface. The surface-active species can include polar organic species of the oil-water interface, such as carboxylic acids or naphthenic acids. The solid absorbed species can include non-volatile organic (hydrocarbon) species, such as asphaltenes, resins, waxes, and/or other high molecular weight hydrocarbons of the oil-water interface.

In step 207, a TOF-SIMS instrument (e.g., FIG. 1) is used to determine a mass spectrum (e.g., a 1D mass spectrum or a 2D mass spectrum) of the solid-phase test sample of 205 in a vacuum environment. In measuring a 1D mass spectrum, the primary ion beam can be configured as a small diameter spot that bombards the surface of the solid-phase test sample for analysis. The 2D mass spectrum can represent the mass spectrum of the solid-phase test sample over a scan area defined by two coordinate axes that extend parallel to the top surface of the solid-phase test sample. In measuring the 2D mass spectrum, the primary ion beam can be configured as a small diameter spot that scans the surface of the solid-phase test sample over the scan area, and the output of the detector that represents the yield of secondary ions over the scan area can be synchronized with the primary beam scan. In embodiments, the TOF-SIMS instrument can be configured to measure a mass spectrum of the solid-phase test sample in a negative-mode to characterize the mass spectrum of carboxylic acids or naphthenic acids of the oil-water interface and measure a mass spectrum of the solid-phase test sample in a positive-mode to characterize the mass spectrum of asphaltenes of the oil-water interface, which assumes a protonation of heteroatoms.

In step 209, the mass spectrum of 207 can be processed to extract information characterizing the surface-active species and solid adsorbed species in the solid-phase test sample. In embodiments, the mass spectrum can be processed to determine concentrations of surface-active species and solid adsorbed species in the solid-phase test sample.

In step 211, the information of 209 can be used to determine one or more properties of the oil-water interface of formation fluid sample of 201. For example, the one or more properties can represent interfacial tension and/or interfacial elasticity behavior of the oil-water interface of the formation fluid sample. In embodiments, the one or more properties can be determined using a correlation that relates concentrations of surface-active species and solid adsorbed species in the solid-phase test sample to the one or more properties. The correlation can be derived from laboratory experiments on oil-water interface material of varying concentrations of surface-active species and solid adsorbed species where the property (e.g., interfacial tension and/or interfacial elasticity behavior) is known or measured using standard techniques.

In step 213, a formation rock sample is obtained that corresponds to the formation fluid sample of 201. The formation rock sample can be a core (FIG. 4), a plug taken from a core, a slab cut from a core, or drill cuttings that are correlated to a depth of drilling. In embodiments, the formation rock sample of 213 can originate from a subterranean depth or location that corresponds to the depth or location of the downhole sampling operations that collected the formation fluid sample of 201.

In step 215, a TOF-SIMS instrument (e.g., FIG. 1) is used to determine a mass spectrum (e.g., a depth profile or 3D depth profile) of the formation rock sample of 213 in a vacuum environment. The depth profile can represent the mass spectrum of the formation rock sample as a function of depth from a surface of the formation rock sample. In measuring the depth profile, the primary ion beam can be configured as a small diameter spot that bombards a surface of the formation rock sample for analysis. The TOF-SIMS instrument can alternate between bombardment/analysis and an abrasion sequence and the output of the detector that represents the yield of secondary ions can be synchronized with the bombardment/analysis. The three-dimensional (3D) depth profile can represent the mass spectrum of the formation rock sample over a scan volume defined by two coordinate axes that extend parallel to a surface of the formation rock sample together with an orthogonal depth dimension. In measuring the 3D depth profile, the TOF-SIMS instrument can alternate between scanning analysis and an abrasion sequence. The abrasion sequence can be configured to abrade or remove layers of the formation rock sample at a rate that varies according to the density and chemical nature of the abraded layers, which can be calibrated by measuring the depth of craters made by the TOF-SIMS instrument (or similar TOF-SIMS instrument) into formation rock samples using optical (interferometry) or mechanical (Talystep) methods. The TOF-SIMS instrument can be configured in a negative mode and/or a positive mode in step 215.

In embodiments, the part of formation rock sample that is inspected, scanned, or abraded by the TOF-SIMS instrument in step 215 can be polished or cut to expose the surface of interest. Furthermore, the part of formation rock sample that is inspected, scanned, or abraded by the TOF-SIMS instrument in step 215 can include one or more fluid inclusions and/or kerogen material and/or biomarkers situated in various layers of the formation rock sample. In this case, the mass spectrum measured by the TOF-SIMS instrument in step 215 characterizes ion species of the fluid inclusion(s) in the formation rock sample and/or ion species of kerogen in the formation rock sample and/or ion species of biomarkers in the formation rock sample. Such biomarkers can be contained in oil or condensate fluid or kerogen or other component(s) trapped in the formation rock sample. For example, the biomarkers can include certain hopanes, styrenes or other parameters, such as C30ββ hopane, C31αβ hopane, C29ααα styrene, and a Ts parameter described in Farrimond et al. "Biomarker maturity parameters: the role of generation and thermal degradation," Org. Geochemistry, Vol. 29, No. 5-7, 1998, pgs. 1181-1197.

Alternatively or additionally, the operations of step 215 can involve extracting and isolation kerogen material (in solid form) from the rock formation sample of 213 (for example, by removal of carbonates, silicates, pyrite and other non-kerogen components from the rock formation sample or part thereof), and using a TOF-SIMS instrument (e.g., FIG. 1) to determine a mass spectrum (e.g., a 1D mass spectrum, 2D mass spectrum, depth profile, or 3D depth profile) of the extracted kerogen in a vacuum environment. In this case, the mass spectrum measured by the TOF-SIMS instrument in step 215 characterizes ion species of kerogen in the formation rock sample and/or ion species of biomarkers in the extracted kerogen.

In step 217, the mass spectrum of 215 can be processed to extract information characterizing fluid inclusion(s) in the formation rock sample. In embodiments, the mass spectrum can be processed to determine concentrations of ion species of one or more fluid inclusions (such as concentrations of salt ions including sodium (Na), chlorine (Cl), magnesium (Mg), calcium (Ca), and sulfate ($SO_4$)) in the formation rock sample. The concentrations of salt ions of the fluid inclusion(s) can inform about salinity of the formation fluids from which the rock sample was obtained.

The processing of step 217 can also be configured to process the mass spectrum of 215 to extract information characterizing kerogen and/or biomarkers contained in the formation rock sample of 213. In embodiments, the mass spectrum can be processed to determine concentrations of organic species of kerogen contained in the formation rock sample and concentrations or relative abundance of biomarkers contained in the formation rock sample. The concentration of the organic species of kerogen and/or the concentration or relative abundance of the biomarkers can provide important information about migration pathways or paleo-accumulations and inform about source rock maturity. Further, the concentration of the organic species of kerogen and/or the concentration or relative abundance of the biomarkers can help in the assessment of biodegradation and secondary cracking.

In step 219, the information of 217 can be used to determine one or more properties of the formation rock sample of 213. For example, the one or more properties can represent salinity of fluid inclusion(s) contained in the formation rock sample of 213. In embodiments, salinity can be determined using a correlation that relates concentrations of salt-related ion species of the fluid inclusion(s) and fluid inclusion volume to salinity. The correlation can be derived from laboratory experiments on fluid samples of varying concentrations of salt-related ion species where the salinity of the fluid samples is known or measured using standard techniques. In another example, the one or more properties can relate to thermal maturity of kerogen contained in the formation rock sample or distribution of kerogen and biomarkers in the formation rock sample. These properties can help in the assessment of biodegradation and secondary cracking.

In step 221, the information derived from steps 211 and 219 can be combined with one another and possibly with corresponding depth-correlated well log data for output to a user for reservoir evaluation. For example, the combined information of steps 211 and 219 and corresponding depth-correlated well log data can be displayed or otherwise output to a user for evaluating and assessing reservoir properties.

In embodiments, the information output by the user in 221 can include one or more properties that represent interfacial tension and/or interfacial elasticity behavior of formation fluids, which can be important factors for production and recovery.

Moreover, the information output by the user in 221 can include one or more properties that represent salinity of formation fluids, which can also be important factors for production and recovery including production challenges due to flow assurance and corrosion.

Furthermore, the information output by the user in 221 can include one or more properties that relate to kerogen maturity or distribution of kerogen and biomarkers, which can provide insight as to the type of organic material and a comprehensive picture of the expected hydrocarbon abundance and quality in the source rock and nearby reservoirs.

Figure 3:
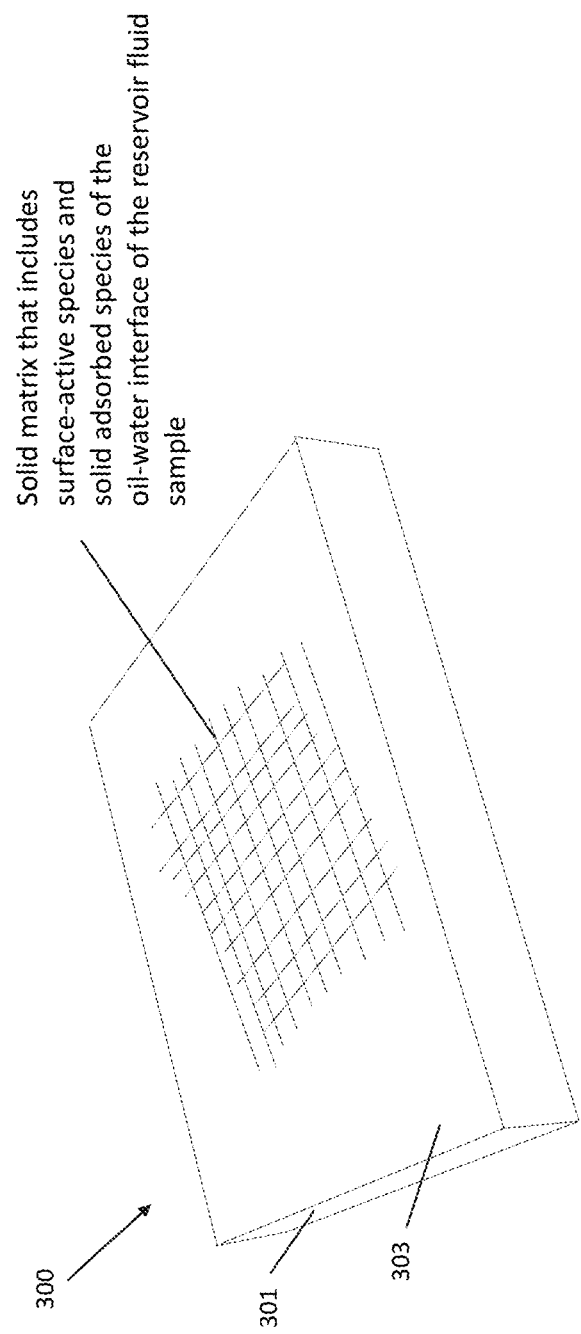
FIG. 3 is a schematic diagram of a solid-phase test sample used in the workflow of FIG. 2.

FIG. 3 illustrates a solid-phase test sample 300 used in the workflow of FIG. 2. The solid-phase test sample 300 includes a substrate 301 with a top surface 303 that supports or holds a solid matrix that includes the surface-active species and solid adsorbed species of the oil-water interface. The solid-phase test sample 300 can be prepared by heating or drying the isolated oil-water interface (or portion thereof) to evaporate volatile hydrocarbons and water of the isolated oil-water interface while leaving behind solids that include surface-active species and solid adsorbed species of the oil-water interface.

Figure 4:
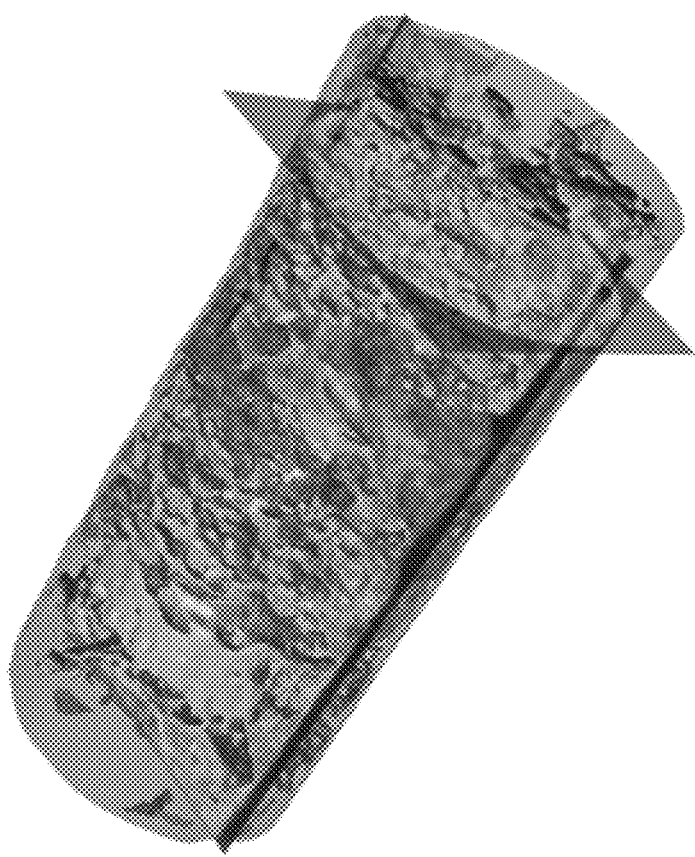
FIG. 4 is a schematic diagram of a core that is collected from subterranean rock. It also depicts cross-sectional planes that can be used to saw a core to obtain one or more slabs from the larger core.

FIG. 4 illustrates a core that is collected from subterranean rock. The core can be collected by in situ rock sampling operations performed by commercially-available downhole tools or other suitable formation rock sampling techniques. FIG. 4 also depicts cross-sectional planes that can be used to saw the core to obtain one or more slabs from the larger core.

Figure 5:
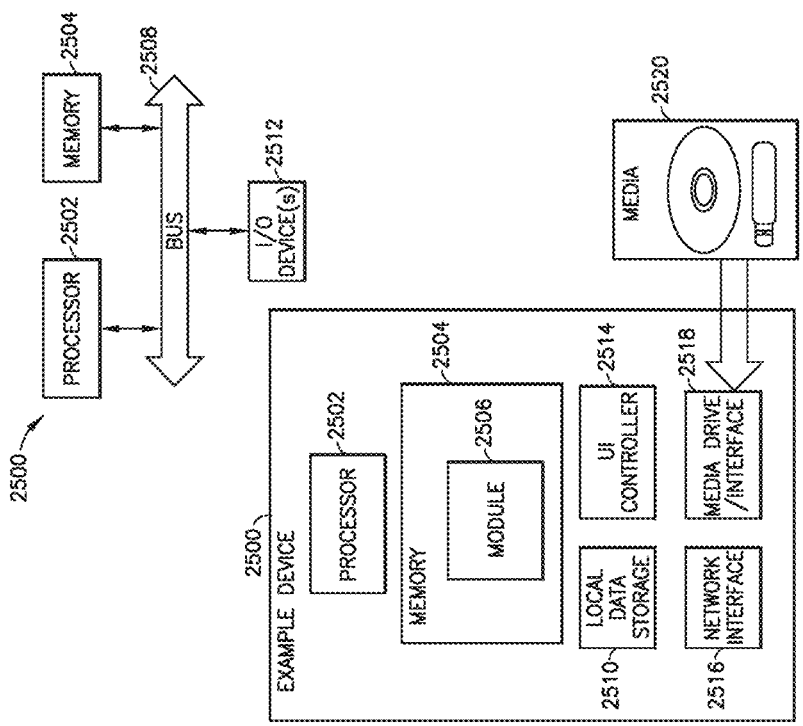
FIG. 5 is a functional block diagram of a computer processing system.

FIG. 5 illustrates an example device 2500, with a processor 2502 and memory 2504 that can be configured to implement the various embodiments of the information processing methodology and workflows or parts thereof as discussed in the present application. Memory 2504 can also host one or more databases and can include one or more forms of volatile data storage media such as random-access memory (RAM), and/or one or more forms of nonvolatile storage media (such as read-only memory (ROM), flash memory, and so forth).

Device 2500 is one example of a computing device or programmable device and is not intended to suggest any limitation as to scope of use or functionality of device 2500 and/or its possible architectures. For example, device 2500 can comprise one or more computing devices, programmable logic controllers (PLCs), etc.

Further, device 2500 should not be interpreted as having any dependency relating to one or a combination of components illustrated in device 2500. For example, device 2500 may include one or more of computers, such as a laptop computer, a desktop computer, a mainframe computer, etc., or any combination or accumulation thereof.

Device 2500 can also include a bus 2508 configured to allow various components and devices, such as processors 2502, memory 2504, and local data storage 2510, among other components, to communicate with each other.

Bus 2508 can include one or more of any of several types of bus structures, including a memory bus or memory controller, a peripheral bus, an accelerated graphics port, and a processor or local bus using any of a variety of bus architectures. Bus 2508 can also include wired and/or wireless buses.

Local data storage 2510 can include fixed media (e.g., RAM, ROM, a fixed hard drive, etc.) as well as removable media (e.g., a flash memory drive, a removable hard drive, optical disks, magnetic disks, and so forth). One or more input/output (I/O) device(s) 2512 may also communicate via a user interface (UI) controller 2514, which may connect with I/O device(s) 2512 either directly or through bus 2508.

In one possible implementation, a network interface 2516 may communicate outside of device 2500 via a connected network. A media drive/interface 2518 can accept removable tangible media 2520, such as flash drives, optical disks, removable hard drives, software products, etc. In one possible implementation, logic, computing instructions, and/or software programs comprising elements of module 2506 may reside on removable media 2520 readable by media drive/interface 2518.

In one possible embodiment, input/output device(s) 2512 can allow a user (such as a human annotator) to enter commands and information to device 2500, and also allow information to be presented to the user and/or other components or devices. Examples of input device(s) 2512 include, for example, sensors, a keyboard, a cursor control device (e.g., a mouse), a microphone, a scanner, and any other input devices known in the art. Examples of output devices include a display device (e.g., a monitor or projector), speakers, a printer, a network card, and so on.

Various systems and processes of present disclosure may be described herein in the general context of software or program modules, or the techniques and modules may be implemented in pure computing hardware. Software generally includes routines, programs, objects, components, data structures, and so forth that perform particular tasks or implement particular abstract data types. An implementation of these modules and techniques may be stored on or transmitted across some form of tangible computer-readable media. Computer-readable media can be any available data storage medium or media that is tangible and can be accessed by a computing device. Computer readable media may thus comprise computer storage media. "Computer storage media" designates tangible media, and includes volatile and non-volatile, removable, and non-removable tangible media implemented for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible medium which can be used to store the desired information, and which can be accessed by a computer. Some of the methods and processes described above, can be performed by a processor. The term "processor" should not be construed to limit the embodiments disclosed herein to any particular device type or system. The processor may include a computer system. The computer system may also include a computer processor (e.g., a microprocessor, microcontroller, digital signal processor, general-purpose computer, special-purpose machine, virtual machine, software container, or appliance) for executing any of the methods and processes described above.

The computer system may further include a memory such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device.

Some of the methods and processes described above, can be implemented as computer program logic for use with the computer processor. The computer program logic may be embodied in various forms, including a source code form or a computer executable form. Source code may include a series of computer program instructions in a variety of programming languages (e.g., an object code, an assembly language, or a high-level language such as C, C++, or JAVA). Such computer instructions can be stored in a non-transitory computer readable medium (e.g., memory) and executed by the computer processor. The computer instructions may be distributed in any form as a removable storage medium with accompanying printed or electronic documentation (e.g., shrink wrapped software), preloaded with a computer system (e.g., on system ROM or fixed disk), or distributed from a server or electronic bulletin board over a communication system (e.g., the Internet or World Wide Web).

Alternatively or additionally, the processor may include discrete electronic components coupled to a printed circuit board, integrated circuitry (e.g., Application Specific Integrated Circuits (ASIC)), and/or programmable logic devices (e.g., a Field Programmable Gate Arrays (FPGA)). Although only a few example embodiments have been described in detail above, those skilled in the art will readily appreciate that many modifications are possible in the example embodiments without materially departing from this invention.

Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

What is claimed is:

1. A method for subsurface characterization, comprising:
   obtaining a formation fluid sample;
   extracting an oil-water interface from the formation fluid sample;
   preparing a solid-phase test sample from the oil-water interface extracted from the formation fluid sample;
   configuring a time-of-flight secondary ion mass spectrometry instrument to analyze the solid-phase test sample to determine a mass spectrum of the solid-phase test sample; and
   processing the mass spectrum of the solid-phase test sample to determine at least one property of the oil-water interface of the formation fluid sample,
   wherein the solid-phase test sample includes surface-active species and solid adsorbed species of the oil-water interface, and
   wherein the preparing the solid-phase test sample involves heating or drying the oil-water interface extracted from the formation fluid sample.

2. A method according to claim 1, wherein:
the mass spectrum of the solid-phase test sample comprises a one-dimensional mass spectrum or a two-dimensional mass spectrum.

3. A method according to claim 1, wherein:
the surface-active species include polar organic species of the oil-water interface.

4. A method according to claim 3, wherein:
the polar organic species of the oil-water interface include carboxylic acids or naphthenic acids.

5. A method according to claim 1, wherein:
the solid absorbed species include non-volatile organic species of the oil-water interface.

6. A method according to claim 5, wherein:
the non-volatile organic species of the oil-water interface include at least one species of asphaltenes, resins, and/or waxes.

7. A method according to claim 1, wherein:
the at least one property is determined from a correlation that relates concentrations of the surface-active species and the solid adsorbed species in the solid-phase test sample to the at least one property.

8. A method according to claim 1, wherein:
the at least one property represents interfacial tension or interfacial elasticity behavior of the oil-water interface of the formation fluid sample.

9. A method according to claim 1, further comprising:
obtaining a formation rock sample corresponding to the formation fluid sample; and
configuring the time-of-flight secondary ion mass spectrometry instrument or a different time-of-flight secondary ion mass spectrometry instrument to analyze the formation rock sample or part thereof to determine a mass spectrum of the formation rock sample or part thereof.

10. A method according to claim 9, wherein:
the mass spectrum of the formation rock sample or part thereof comprises a depth profile or 3D depth profile of species of the formation rock sample.

11. A method according to claim 9, further comprising:
processing the mass spectrum of the formation rock sample or part thereof to determine at least one property related to the formation rock sample or part thereof.

12. A method according to claim 11, wherein:
the at least one property represents salinity of at least one fluid inclusion in the formation rock sample.

13. A method according to claim 12, wherein:
the at least one property is determined from a correlation that relates concentrations of salt-related ion species in the formation rock sample to the salinity.

14. A method according to claim 11, wherein:
the at least one property relates to thermal maturity of kerogen in the formation rock sample or part thereof or other kerogen properties or biomarkers in the formation rock sample or part thereof.

15. A method according to claim 9, further comprising:
extracting kerogen material from the formation rock sample; and
configuring the time-of-flight secondary ion mass spectrometry instrument or a different time-of-flight secondary ion mass spectrometry instrument to analyze the kerogen material to determine a mass spectrum of the kerogen material.

16. A method according to claim 15, further comprising:
processing the mass spectrum of the kerogen material to determine at least one property related to the formation rock sample, wherein the at least one property relates to thermal maturity of kerogen or other kerogen properties or biomarkers in the formation rock sample.

17. A method according to claim 9, further comprising:
i) processing the mass spectrum of the solid-phase test sample to determine at least one property related to the oil-water interface of the formation fluid sample;
ii) processing the mass spectrum of the formation rock sample or part thereof to determine at least one property related to the formation rock sample or part thereof; and
iii) combining the at least one property related to the oil-water interface of the formation fluid sample of i) and the at least one property related to the formation rock sample or part thereof of ii) for output or display to a user.

18. A method for subsurface characterization, comprising:
i) obtaining a formation fluid sample;
ii) extracting an oil-water interface from the formation fluid sample;
iii) preparing a solid-phase test sample from the oil-water interface extracted from the formation fluid sample, wherein the solid-phase test sample includes surface-active species and solid adsorbed species of the oil-water interface;
iv) configuring a time-of-flight secondary ion mass spectrometry instrument to analyze the solid-phase test sample to determine a mass spectrum of the solid-phase test sample;
v) processing the mass spectrum of the solid-phase test sample to determine at least one property related to the oil-water interface of the formation fluid sample, wherein the at least one property of v) relates to interfacial tension or interfacial elasticity behavior of the oil-water interface of the formation fluid sample;
vi) obtaining a formation rock sample corresponding to the formation fluid sample;
vii) configuring the time-of-flight secondary ion mass spectrometry instrument or a different time-of-flight secondary ion mass spectrometry instrument to analyze the formation rock sample or part thereof to determine a mass spectrum of the formation rock sample or part thereof;
viii) processing the mass spectrum of the formation rock sample or part thereof to determine at least one property related to the formation rock sample or part thereof, wherein the at least one property of viii) is related to at least one of salinity of at least one fluid inclusion in the formation rock sample or part thereof, thermal maturity of kerogen in the formation rock sample or part thereof, or other kerogen properties or biomarkers in the formation rock sample or part thereof; and
ix) combining the at least one property related to the oil-water interface of the formation fluid sample of v) and the at least one property related to the formation rock sample or part thereof of viii) for output or display to a user.

19. A method according to claim 18, wherein:
the mass spectrum of the solid-phase test sample comprises a one-dimensional mass spectrum or a two-dimensional mass spectrum.

20. A method according to claim 19, wherein:
the surface-active species include polar organic species of the oil-water interface,
the solid absorbed species include non-volatile organic species of the oil-water interface, or
both.

21. A method according to claim 20, wherein:
the polar organic species of the oil-water interface include carboxylic acids or naphthenic acids,
the non-volatile organic species of the oil-water interface include at least one species of asphaltenes, resins, and/or waxes, or
both.

22. A method according to claim 18, wherein:
the preparing involves heating or drying the oil-water interface extracted from the formation fluid sample.

23. A method according to claim 18, wherein:
the at least one property further includes a property determined from a correlation that relates concentrations of the surface-active species and the solid adsorbed species in the solid-phase test sample to the at least one property.

24. A method according to claim 18, wherein:
the mass spectrum of the formation rock sample or part thereof comprises a depth profile or 3D depth profile of species of the formation rock sample.

25. A method according to claim 18, wherein:
the at least one property further includes a property determined from a correlation that relates concentrations of salt-related ion species in the formation rock sample to the salinity.

26. A method according to claim 18, further comprising:
extracting kerogen material from the formation rock sample; and
configuring the time-of-flight secondary ion mass spectrometry instrument or a different time-of-flight secondary ion mass spectrometry instrument to analyze the kerogen material to determine a mass spectrum of the kerogen material.

27. A method according to claim 26, further comprising:
processing the mass spectrum of the kerogen material to determine at least one property related to the formation rock sample, wherein the at least one property relates to thermal maturity of kerogen or other kerogen properties or biomarkers in the formation rock sample.

28. A method according to claim 18, further comprising:
i) processing the mass spectrum of the solid-phase test sample to determine at least one property related to the oil-water interface of the formation fluid sample;
ii) processing the mass spectrum of the formation rock sample or part thereof to determine at least one property related to the formation rock sample or part thereof; and
iii) combining the at least one property related to the oil-water interface of the formation fluid sample of i) and the at least one property related to the formation rock sample or part thereof of ii) for output or display to a user.

* * * * *